UNITED STATES PATENT OFFICE.

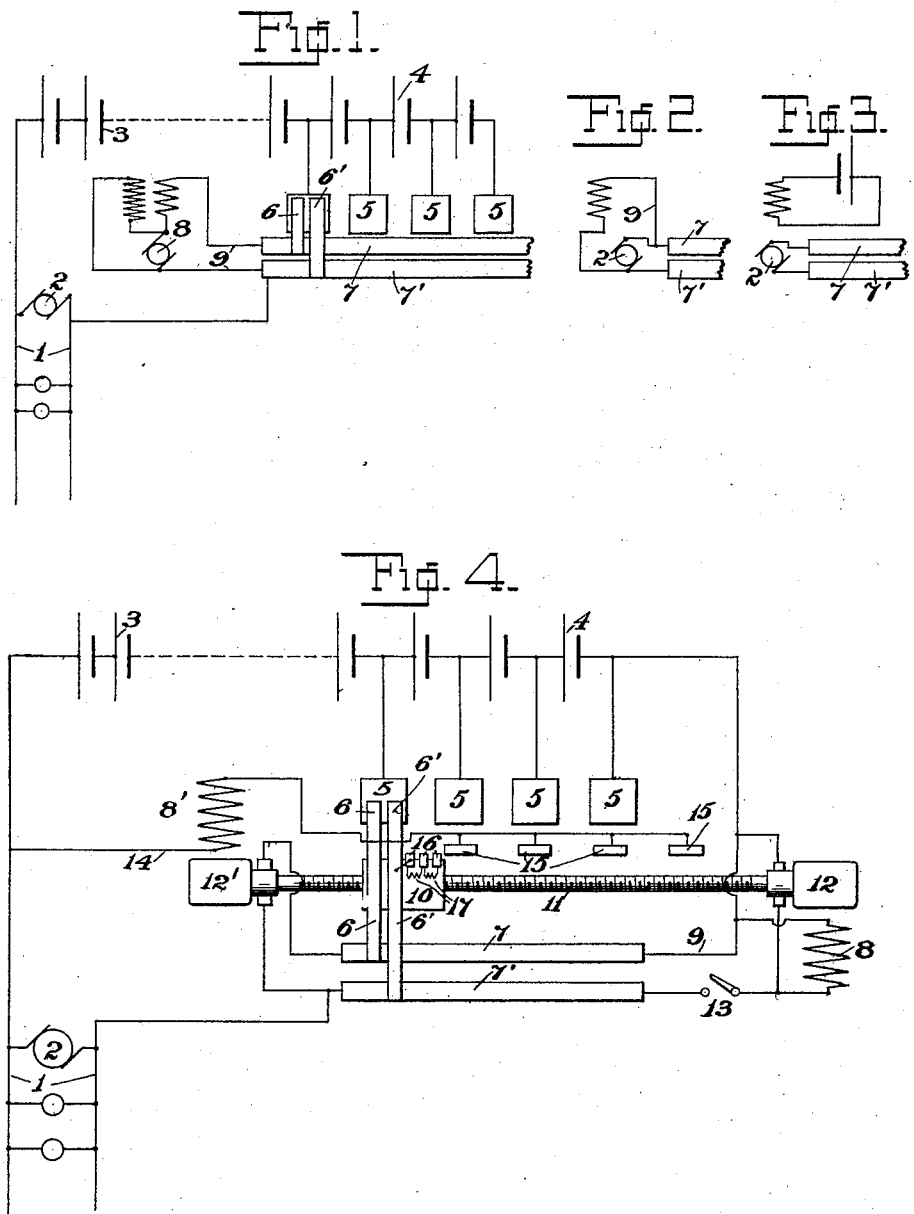

RUFUS N. CHAMBERLAIN, OF DEPEW, NEW YORK, ASSIGNOR TO THE GOULD STORAGE BATTERY COMPANY, OF NEW YORK, N. Y., A CORPORATION OF WEST VIRGINIA.

ELECTRIC SWITCH.

SPECIFICATION forming part of Letters Patent No. 720,327, dated February 10, 1903.

Application filed April 16, 1902. Serial No. 103,089. (No model.)

*To all whom it may concern:*

Be it known that I, RUFUS N. CHAMBERLAIN, a citizen of the United States, residing at Depew, in the county of Erie and State of New York, have invented certain new and useful Improvements in Electric Switches, of which the following is a specification.

This invention relates to electric switches, and more particularly to end-cell switches for storage batteries. In my application, Serial No. 78,945, filed October 17, 1901, is disclosed a means for preventing either opening of the main circuit, short-circuiting of the battery, or undue loss in shunting resistance when the switch is operated to change the number of end cells in circuit. My present invention relates to another means for accomplishing this result, such means consisting of a dynamo-electric counter-electromotive-force generator included in shunt with the end cell at the moment the latter is being cut in or out, so as to momentarily present a counter electromotive force about equal to that of the end cell, and thereby prevent short-circuiting of said end cell, while interposing but little resistance to the main current.

In the accompanying drawings, Figure 1 is a diagrammatic representation of a storage-battery plant provided with my invention. Figs. 2 and 3 show modified forms of the electromotive device. Fig. 4 shows the preferred form of my invention.

Referring to Fig. 1, a main supply or charging circuit 1 is connected to the main generator 2 and to a storage battery 3, having end cells 4, connected with the respective contacts 5 of the end-cell switch. The movable contacts 6 6' of said switch engage with contacts 5 and slide on conducting-bars 7 7', one of which is connected to the main circuit. These contacts 6 6' are placed side by side, so that in operating the switch they will disconnect or break circuit with any one of the fixed contacts 5 dissimultaneously. A counter-electromotive-force generator 8 is included in a connection 9 between the two conducting-bars 7 7', said counter-electromotive-force generator consisting of a dynamo-electric generator—that is, a device which is adapted to generate electromotive force by mechanical as opposed to chemical action. Thus I may use an electric motor having its armature included in connection 9 and with its field excited by shunt connection with the armature, as in Fig. 2, or separately excited, as in Fig. 3, or, as shown in Fig. 1, it may be differentially wound. Any suitable means may be employed to limit the counter electromotive force generated by this motor to substantially that of an end-cell switch included between successive contacts of the end-cell switch. Thus in Fig. 1 the motor may act as a series motor in starting and the shunt-winding on its field may be such as to counteract the series winding when a certain speed is reached, so as to prevent further increase of counterelectromotive force, or means may be provided for restraining the motor-armature from exceeding a certain speed, so as to prevent generation of an excessive counter electromotive force. When an electric motor is used in carrying out my invention as above described, a loading means for same may be used; but in practice the armature even without load will not have time to reach any excessive speed before the end - cell switch reaches the next contact and short-circuits the armature.

With the form of the invention above described the operation is as follows: When the end-cell switch is at rest, it is assumed to be placed with both contacts 6 6' resting on a single contact 5, the motor-armature being therefore short-circuited. When the end-cell switch is moved to cut in another end-cell section, the advance contact 6' first leaves the fixed contact 5 and the motor-armature is then in circuit, but is not generating any electromotive force, as it is at rest. The field-magnet of said motor being then energized by this connection or by separate excitation, the armature will start to rotate and, increasing in speed, will generate an increasing counter electromotive force, which will quickly approximate the electromotive force of one end-cell section, so that when the advance contact 6' reaches the next contact 5, the rear contact 6 being still in contact with the original contact 5 and the end cell-section therefore connected in parallel with the motor, the counter electromotive force generated by the latter will prevent any short-circuiting action. Finally, when the rear contact 6 leaves the rear contact 5 the motor is open-circuited and, subsequently short-circuited when contacts 6' 6 both rest on the next contact 5.

In case a motor is employed to operate the end-cell switch, the counter-electromotive-force generator may advantageously be mechanically connected therewith. In Fig. 4 the end-cell switch contacts 6 6' are shown mounted on a block 10, working as a nut on a screw-shaft 11, operated by the armature of a motor 12, connected to the main circuit and controlled by a switch 13. On this same shaft 11 is the armature 12' of the counter-electromotive-force generator, which is connected in the circuit 9, between the fixed switch-bars 7 7', as above stated, the field-magnet 8' thereof being connected in a circuit 14, leading from one side of the main circuit through said field-magnet to a series of contacts 15, disposed in the path of contacts 16 on the switch-block 10, resistances 17 being interposed between contacts 16, so as to regulate the flow of current to the field. The last contact 17 is connected through switch-contacts 6 to the other side of the main circuit. As soon as the motor 12 is started in action the counter-electromotive-force armature is set in rotation, and as the first contact 16 makes connection to the field through the resistance 17 a weak electromotive force is generated, which is increased by increase of speed and by cutting out of resistance 17 until at the time when the contacts 6 6' are bridging the contacts 5 the electromotive force generated will be approximately the same as that of the end-cell section which at that time is connected in parallel with the counter-electromotive-force generator, so that the battery is not short-circuited. By making the armature 8 of sufficiently low resistance the drop in the main-line current, due to interposition of this armature, may be rendered negligible, it being understood that the maximum counter electromotive force generated by this armature being only equal to that of an end-cell section is negligible compared to the total line voltage.

While I have described my invention in its special adaptation to end-cell switches, in which connection it has special advantages, some features thereof may be applied in other connections.

Having thus described my invention, the following is what I claim as new therein and desire to secure by Letters Patent:

1. The combination with an electric circuit, of a switch connected thereto and having contacts adapted to break connection with the circuit dissimultaneously, of a dynamo-electric generator of counter electromotive force connected between such switch-contacts.

2. The combination of an electric circuit, of a switch having a series of fixed contacts, and movable contacts adapted to disconnect with the fixed contacts dissimultaneously, of a dynamo-electric generator of counter electromotive force connected between the movable switch-contacts.

3. The combination with an electric circuit and a storage battery connected therewith and comprising end cells, of an end-cell switch having a series of fixed contacts, and movable contacts adapted to disconnect with the fixed contacts dissimultaneously, of a dynamo-electric generator of counter electromotive force connected between the movable switch-contacts.

4. The combination with an end-cell switch and its operating-motor, of a dynamo-electric generator mechanically connected to said motor and means for placing the same in shunt with the end-cell sections during the operation of the switch.

5. The combination with an end-cell switch and its operating-motor, of a dynamo-electric counter-electromotive-force generator mechanically connected to said motor and electrically connected between contacts of the end-cell switch.

6. The combination with an end-cell switch having two movable contacts breaking circuit with the fixed contacts dissimultaneously, of a dynamo-electric generator electrically connected with said movable contacts.

7. The combination with an end-cell switch having two movable contacts breaking circuit with the fixed contacts dissimultaneously, of a dynamo-electric generator electrically connected with said movable contacts, and means connected to the end-cell switch for regulating the effect of said dynamo-electric counter-electromotive-force generator.

8. An electric circuit including a storage battery, a switch provided with a series of contacts corresponding to the end cells of said battery for cutting in or out the said end cells thereof, means for operating the switch, a dynamo-electric counter-electromotive-force generator connected to said switch, the switch provided with means for throwing in circuit said counter-electromotive-force generator, connecting the same in parallel with the end cell switched in, and cutting out the said counter-electromotive-force generator, successively, as the switch is moved from one of the contacts to the next, and without opening the main circuit.

9. An electric circuit including a storage battery, an end-cell switch for the same comprising fixed contact-pieces corresponding to the end cells, conducting-bars and a movable pair of contacts to connect one or both of said bars to the fixed contact-pieces, one of said pair of contacts connecting with one conducting-bar and the other of said pair of contacts connecting with the other conducting-bar, a counter-electromotive-force generator having its terminals in connection with the said conducting-bars, the contact-pieces being so arranged that in passing from one fixed contact to the next, one member of the movable pair of contacts is always in contact with a fixed contact-piece and at an intermediate point said pair is in contact with two adjacent contact-pieces.

10. An electric circuit including a storage battery, an end-cell switch for the same comprising fixed contact-pieces corresponding to the end cells, conducting-bars and a movable pair of contacts, to connect one or both of said bars to the fixed contact-pieces, one of said pair of contacts connecting with one conducting-bar and the other of said pair of contacts connecting with the other conducting-bar, a counter-electromotive-force generator having its terminals in connection with the said conducting-bars, the contact-pieces being so arranged that in passing from one fixed contact to the next, one member of the movable pair of contacts is always in contact with a fixed contact-piece and at an intermediate point said pair is in contact with two adjacent contact-pieces, and a resistance-regulating device between the fixed and movable contacts.

RUFUS N. CHAMBERLAIN.

Witnesses:
  A. G. GILPATRICK,
  A. H. SNYDER.